_US005641857A_

United States Patent [19]

Dostalek et al.

[11] Patent Number: 5,641,857
[45] Date of Patent: Jun. 24, 1997

[54] PREPARATION OF POLYTETRAHYDROFURAN

[75] Inventors: Roman Dostalek, Roemerberg; Rolf Fischer, Heidelberg; Ulrich Mueller, Neustadt; Rainer Becker, Bad Durkheim, all of Germany

[73] Assignee: BASF Aktiengesellschaft, Ludwigshafen, Germany

[21] Appl. No.: 545,753

[22] PCT Filed: May 3, 1994

[86] PCT No.: PCT/EP94/01403

§ 371 Date: Nov. 7, 1995

§ 102(e) Date: Nov. 7, 1995

[87] PCT Pub. No.: WO92/26803

PCT Pub. Date: Nov. 24, 1994

[30] Foreign Application Priority Data

May 14, 1993 [DE] Germany .................. 43 16 138.3

[51] Int. Cl.$^6$ .................. C08G 63/82; C08G 65/20; C08G 63/66
[52] U.S. Cl. .................. 528/361; 528/416; 528/417; 560/240; 568/617
[58] Field of Search .................. 528/361, 416, 528/417; 560/240; 568/617

[56] References Cited

U.S. PATENT DOCUMENTS

| | | | |
|---|---|---|---|
| 4,303,782 | 12/1981 | McHale et al. | 528/416 |
| 5,208,385 | 5/1993 | Kahn et al. | 568/617 |
| 5,466,778 | 11/1995 | Lambert et al. | 528/361 |

*Primary Examiner*—Morton Foelak
*Attorney, Agent, or Firm*—Keil & Weinkauf

[57] ABSTRACT

Polytetrahydrofuran or polytetrahydrofuran monoesters of $C_1$–$C_{20}$-monocarboxylic acids or polytetrahydrofuran monoethers of monohydric $C_1$–$C_{20}$-alcohols, having an average molecular weight of from 250 to 10,000 Dalton and liquid at room temperature, are prepared by the cationic polymerization of tetrahydrofuran in the presence of a telogen by a process in which tetrahydrofuran is polymerized in the presence of water, 1,4-butanediol and/or polytetrahydrofuran having an average molecular weight of from 200 to 700 Dalton and/or of a $C_1$–$C_{20}$-monocarboxylic acid and/or of a monohydric $C_1$–$C_{20}$-alcohol with the aid of a catalytic amount of a zeolite catalyst which has an $SiO_2$/$Al_2O_3$ molar ratio of from 4:1 to 100:1 and in which the population ratio P of the acid centers on the external surface of the zeolite to the total number of acid centers of the zeolite is 0.03/1 or more.

8 Claims, No Drawings

PREPARATION OF POLYTETRAHYDROFURAN

The present invention relates to a process for the preparation of polytetrahydrofuran or polytetrahydrofuran monoesters of $C_1$–$C_{20}$-monocarboxylic acids or polytetrahydrofuran monoethers of monohydric $C_1$–$C_{20}$-alcohols having an average molecular weight of from 250 to 10,000 Dalton, by cationic polymerization of tetrahydrofuran in the presence of a telogen.

Polytetrahydrofuran (PTHF), also referred to as polyoxybutylene glycol, is used as an intermediate for the preparation of polyurethane, polyester and polyamide elastomers, for the preparation of which it is used as the diol component. Incorporation of PTHF into these polymers makes then soft and flexible, and therefore also referred to as the plasticizer component for these polymers.

PTHF monoesters of monocarboxylic acids are used, for example, as plasticizers (U.S. Pat. No. 4,482,411), impregnating agents (DE-A 2 932 216) or monomers (EP-A 286 454). PTHF monoethers of monohydric alcohols are used for the preparation of special polyurethanes (JP-A 105029/1988) and special lubricating oils (EP-A 336 171).

The cationic polymerization of tetrahydrofuran (THF) with the aid of catalysts was described by Meerwein et al. (Angew. Chem. 72 (1960), 927). Either preformed catalysts are used or the catalysts are produced in situ in the reaction mixture. This is done by producing oxonium ions in the reaction medium with the aid of strong Lewis acids, such as boron trichloride, aluminum chloride, tin tetrachloride, antimony pentachloride, iron(III) chloride or phosphorus pentafluoride, or by means of strong Brönstedt acids, such as perchloric acid, tetrafluoboric acid, fluorosulfonic acid, chlorosulfonic acid, hexachlorostannic acid, iodic acid, hexachloroantimonic acid or tetrachloroferric acid, and with the aid of reactive compounds referred to as promoters, such as alkylene oxides, eg. ethylene oxide, propylene oxide, epichlorohydrin or butylene oxide, oxetanes, orthoesters, acetals, α-haloethers, benzyl halides, triarylmethyl halides, acyl chlorides, β-lactones, carboxylic anhydrides, thionyl chloride, phosphoryl chloride or halosulfonic acids, said oxonium ions initiating the polymerization of the THF. However, out of the large number of these catalyst systems, only a few have become important industrially since some of them are highly corrosive and/or, in the preparation of the PTHF, lead to discolored PTHF products of only limited use. In addition, many of these catalyst systems do not have a catalytic action in the strict sense but must be used in stoichiometric amounts, based on the macromolecule to be prepared, and are consumed during the polymerization. For example, in the preparation of PTHF with fluorosulfonic acid as the catalyst according to U.S. Pat. No. 3,358,042, two molecules of fluorosulfonic acid must be used as the catalyst per molecule of PTHF. A particular disadvantage of the use of halogen-containing catalyst systems is that they lead to the formation of halogenated byproducts in the preparation of PTHF and said byproducts are difficult to separate from the pure PTHF and have an adverse effect on its properties.

In the preparation of PTHF in the presence of the stated promoters, these promoters are incorporated as telogens in the PTHF molecule, so that the primary product of the THF polymerization is not PTHF but a PTHF derivative, for example a PTHF diester or sulfonate, from which PTHF must be liberated in a further reaction, for example by hydrolysis or transesterification (cf. U.S. Pat. No. 2,499,725 and DE-A 27 60 272). When alkylene oxides are used as promoters, they also act as comonomers and are incorporated into the polymer, with the result that THF/alkylene oxide copolymers having different properties, in particular performance characteristics differing from those of PTHF, are formed.

U.S. Pat. No. 4,568,775 and U.S. Pat. No. 4,658,065 describe a process for the preparation of PTHF, in which heteropoly acids are used as catalysts. The heteropoly acids have a certain degree of solubility in the polymerization mixture and in the polymer and, since they cause discoloration of the PTHF product, must be removed from the said product by expensive technical measures, ie. addition of a hydrocarbon for precipitating the heteropoly acids, removal of the precipitated heteropoly acids and removal of the added hydrocarbon. This too makes the process uneconomical.

In U.S. Pat. No. 5,149,862, sulfate-doped zirconium dioxide is used as a heterogeneous polymerization catalyst which is insoluble in the reaction medium. To accelerate the polymerization, a mixture of acetic acid and acetic anhydride is added to the reaction medium, since, in the absence of these promoters, the polymerization takes place only very slowly and a conversion of only 6% is achieved during a period of 19 hours. This process gives the THF diacetates which subsequently have to be converted into PTHF by hydrolysis or transesterification.

PTHF diesters are likewise formed in the polymerization of THF with bleaching earth catalysts according to EP-A 3112.

In U.S. Pat. No. 4,303,782, zeolites are used for the preparation of PTHF. The THF polymers obtainable by this process have extremely high average molecular weights ($M_n$ from 250,000 to 500,000 D) and are unsuitable for the abovementioned intended uses. Accordingly, this process, too, has not become important industrially. A further serious disadvantage of this process is the low space-time yield (about 4% in 24 hours) achieved with the zeolites used therein.

According to U.S. Pat. No. 4,120,903, PTHF can be prepared from THF and water with the aid of superacidic Nafion® ion exchange resins. Because they are difficult to prepare, these special ion exchangers are very expensive and thus increase the cost of the PTHF prepared with their aid. A further disadvantage of these ion exchange resins is their inadequate long-term stability and their poor reactivity, which likewise has an adverse effect on the cross-efficiency of this process.

PTHF esters of monocarboxylic acids are prepared according to EP-A 286 454 by polymerizing THF by a ring cleavage polymerization reaction catalyzed by a Lewis or Brönstedt acid and terminating the polymerization by the addition of an acyl halide and subsequent hydrolytic working up of the reaction mixture or by the addition of a salt of a carboxylic acid, with formation of the PTHF monoesters. Since very strong and highly corrosive Lewis or Brönstedt acid catalysts, such as antimony pentafluoride, silver tetrafluoborate or trifluoromethanesulfonic acid, have to be used in this process and in turn require the use of particularly corrosion-resistant special materials, the cost of the apparatus for this process is high.

JP-A 83 028/1983 relates to the polymerization of THF in the presence of an acyl halide or carboxylic anhydride, a heteropoly acid being used as the catalyst under anhydrous conditions. However, this gives PTHF diesters which cannot be selectively converted into the corresponding monoesters and are therefore hydrolyzed completely to PTHF.

EP-A 503 394 relates to a process for the preparation of PTHF monoesters of monocarboxylic acids, in which THF is polymerized in the presence of a monocarboxylic acid and of a heteropoly acid catalyst.

According to JP-A 105 029/1988, polyether glycol monoethers are prepared by the cationic polymerization of cyclic ethers, such as tetrahydrofuran, with ring cleavage, in the presence of monohydric alcohols, with the aid of Lewis acid catalysts. Examples of such catalysts are boron trifluoride, ammonium pentafluoride and aluminum trichloride. In order to initiate the polymerization reaction, a 3-membered or 4-membered ether, for example an epoxide of oxetane, must also be added. The disadvantages of this process are that the polymerization cannot be carried out continuously and the Lewis acid catalysts cannot be reused. In addition, these Lewis acids are highly corrosive, so that the apparatuses coming into contact with them must be constructed from particularly corrosion-resistant special materials, with the result that the process is considerably more expensive.

JP-A 159 824 (1984) describes a process for the polymerization of cyclic ethers with the aid of hydrated heteropoly acid catalysts in the presence of alcohols. According to this publication, however, only relatively short-chain polymers can be obtained. In an experiment for the preparation of PTHF monoisopropyl ethers, carried out according to this publication, no polymeric product can be isolated.

U.S. Pat. No. 4,658,065 relates to a process for the preparation of polyetherpolyols, tetrahydrofuran being copolymerized with polyhydric alcohols with the aid of hydrated heteropoly acid catalysts. This patent also proposes preparing polyoxyalkylene alcohol monoethers by reacting the relevant cyclic ethers with monohydric alcohols and with hydrated heteropoly acid catalysts and/or hydrated reactants. However, under reaction conditions used in accordance with this patent, only mixtures of the relevant polyoxyalkylene glycols and polyoxyalkylene glycol monoethers, which are difficult to separate, are obtained. An additional disadvantage of this process is the expensive separation of the heteropoly acid catalyst from the product.

EP-A 503 393 likewise describes a process for the preparation of PTHF monoethers of monoalcohols with the aid of a heteropoly acid catalyst.

It is an object of the present invention to provide an economical process for the preparation of PTHF, PTHF monoesters of monocarboxylic acids and PTHF monoethers of monohydric alcohols, which process does not have the disadvantages of the above processes and permits the preparation of PTHF or of the stated PTHF derivatives directly by the polymerization of THF in the presence of the particular telogens, ie. water, monocarboxylic acid or monohydric alcohol. Catalysts suitable for this purpose should have a long life and should be readily regeneratable.

We have found that this object is achieved by a process for the preparation of polytetrahydrofuran or polytetrahydrofuran monoesters of $C_1$–$C_{20}$-monocarboxylic acids or polytetrahydrofuran monoethers of monohydric $C_1$–$C_{20}$-alcohols, having an average molecular weight of from 250 to 10,000 Dalton, by the cationic polymerization of tetrahydrofuran in the presence of a telogen, wherein tetrahydrofuran is polymerized in the presence of water, 1,4-butanediol and/or polytetrahydrofuran having an average molecular weight of from 200 to 700 Dalton and/or of a $C_1$–$C_{20}$-monocarboxylic acid and/or of a monohydric $C_1$–$C_{20}$-alcohol with the aid of a catalytic amount of a zeolite catalyst which has an $SiO_2/Al_{O3}$ molar ratio of from 4:1 to 100:1 and in which the population ratio P of the acid centers on the external surface of the zeolite to the total number of acid centers of the zeolite is 0.03/1 or more.

Zeolites are used as polymerization catalysts in the novel process. Zeolites are defined as examples of aluminosilicates which, owing to their particular chemical structure, form three-dimensional networks with defined pores and channels in the crystal. Depending on their composition, in particular the $SiO_2/Al_2O_3$ molar ratio, and on their crystal structure, which is determined by the method of preparation of the zeolites in addition to the stated atomic ratio, a distinction is made between various zeolite types, the names of some of which are attributed to naturally occurring zeolite minerals of similar composition and structure, for example the faujasites, mordenites or clinoptilolites, or which, if specific analogs for the synthetic zeolites are absent in nature or these zeolites form a structural subclass of the naturally occurring zeolites, are designated by acronyms, for example the Y and X zeolites of the faujasite type or the zeolite having a pentasil structure, such as ZSM-5, ZSM-11 or ZBM-10. Summaries on the chemical composition of the zeolites, their spatial and chemical structure and the method of their preparation appear in, for example, D. W. Breck, Zeolite Molecular Sieves, Wiley, N.Y., 1974.

A critical feature of the novel process is the choice of zeolites which have an $SiO_2/Al_2O_3$ molar ratio of from 4:1 to 100:1, in particular from 10:1 to 100:1, preferably from 15:1 to 90:1, particularly preferably from 20:1 to 80:1, and a population ratio P of the acid centers on the external surface of the zeolite to the total number of acid centers of the zeolite of 0.03/1 or more, preferably from 0.03/1 to 0.35/1, particularly preferably from 0.03/1 to 0.1/1. The primary crystals of these zeolites have a particle size of up to 0.5 µm, preferably up to 0.1 µm, particularly preferably up to 0.05 µm.

Even in zeolites of the same type which have the same $SiO_2/Al_2O_3$ molar ratio, the population ratio P of the acid centers on the external surface of the zeolite to the total number of acid centers of the zeolite differs very greatly depending on the particle size for the primary crystals of the zeolites, even when the populations of the total numbers of acid centers in the zeolites are the same. Zeolites in which the primary crystals have a smaller particle size possess a larger number of acid centers on the external surface per unit weight than zeolites in which the primary crystals have larger particles sizes. This difference is not detected by conventional adsorption methods for determining the external and internal surface area of the zeolite, for example those stated in U.S. Pat. No. 4,303,782.

We have found that zeolites whose population ratio P and whose $SiO_2/Al_2O_3$ molar ratio have the abovementioned values catalyze the polymerization of THF to PTHF or PTHF monoesters or PTHF monoethers having an average molecular weight of 250 to 10,000 Dalton, particularly efficiently, ie. with a high conversion, and give PTHF or the relevant PTHF derivatives in high yields. No satisfactory explanation of the situation has been found to date. It is possible that these finely divided zeolites have a surface microstructure which differs from that of zeolites having larger particle sizes.

The population ratio P of the acid centers on the external surface of the zeolite to the total number of acid centers of the zeolite can be determined from the number of adsorbed amine on the surface of the zeolite and the total amount of amine adsorbed by the zeolite. The determination of the acid centers on the external surface of the zeolite is preferably carried out using tri-butylamine, whereas pyridine is preferably used for determining the total number of acid centers of the zeolite. Otherwise, the determination of the population ratio P can be carried out by the method as stated in U.S.

Pat. No. 4,588,846, which describes the effect of finely divided zeolites on the reaction of cyclic olefins in water. However, the process for the reaction of cyclic olefins with water differs fundamentally from the polymerization of THF to PTHF.

All zeolites which meet the abovementioned preconditions can be used in the novel process. Examples of these are zeolites of the mordenite group, zeolites of the faujasite group, in particular the synthetic X and Y zeolites, in particular stabilized zeolites of the USY type. Particularly preferred are those Y and USY zeolites which have an $SiO_2/Al_2O_3$ molar ratio of from 4:1 to 70:1, preferably from 10:1 to 50:1. Alumino- or silicoaluminophosphates having a zeolite structure may also be used.

Zeolites having the pentasil structure, for example ZSM-5, ZMS-11 and ZBM-10 zeolites, are particularly preferably used in the novel process. Among these zeolites of the pentasil group, those which were prepared in such a way that they are substantially free of alkali metal compounds, ie. their alkali metal content is in general less than 50 ppm by weight, have particularly advantageous properties in the novel process. The preparation of alkali-free ZBM-10 zeolites is described in EP-A 7081, and a method for the preparation of substantially alkali-free ZSM-5 zeolites is described by Müler et al. in Occelli, Robson (Eds.), Zeolite Synthesis, A.C.S. Symp. Series 398 (1989), 346. The abovementioned Y and USY zeolites can be prepared by the method of J. Scherzer, Chemical Industries, Vol 42-Octane enhancing zeolitic FCC catalysts, pp 22–38, Marcel Dekker Inc. (1990). The zeolites prepared by these methods are in the H form after a heat treatment at, for example, from 500° to 600° C.

The zeolites having the stated particle sizes of primary crystals can be used as such, for example in a batchwise process for the preparation of PTHF or the stated PTHF derivatives. For continuous processes for the preparation of PTHF or PTHF derivatives, in particular with the use of a fixed-bed arrangement of the catalyst in the reactor, the finely divided zeolites are advantageously used in the form of moldings, for example as spheres or cylinders.

In the novel process, the zeolites are used in the H form, in which acidic OH groups are present. If the zeolites are not obtained in the OH form in their preparation, they can be readily converted into the catalytically active H form by an acid treatment with, for example, mineral acids, such as hydrochloric acid, sulfuric acid or phosphoric acid, or by thermal treatment of a suitable zeolite precursor which contains, for example, ammonium or ammonium compounds as cations, for example by heating to 450°–600° C., preferably 500°–550° C.

As a result of their preparation by hydrothermal synthesis, the zeolites contain a relatively large amount of water of crystallization and of water adsorbed in the cavity structures, which may vary depending on the zeolite type and method of preparation. The water present in the zeolite can be virtually completely expelled therefrom by heating the zeolite to relatively high temperatures. In the novel process, it is possible to use zeolites which have their content of water of crystallization from the preparation, but zeolites whose content of water of crystallization has been reduced by heat treatment to less than 2, particularly advantageously less than 1, % by weight are particularly preferably employed in the novel process.

The dehydration of the zeolite is advantageously carried out by heating the zeolite at from 100° to 550° C., preferably from 140° to 500° C., particularly preferably from 170° to 450° C., until it has the desired water content. The temperature and time required for this purpose can be reduced by carrying out the heat treatment at reduced pressure, in general at from 0.1 to 500, preferably from 1 to 300, particularly preferably from 3 to 100, mbar. The water content of the zeolite can be determined, for example gravimetrically, by comparing aliquots of the zeolite sample treated in this manner with a zeolite sample dried to constant weight, by measuring the weight of the expelled amount of water or by determining this by Karl Fischer titration of the desorbed water.

The untreated and the dehydrated zeolites are added in the polymerization in general in an amount of from 1 to 90, preferably from 4 to 70, particularly preferably from 8 to 60, % by weight, based on the THF used.

In the preparation of PTHF, suitable telogens, ie. substances which cause chain termination in the polymerization, are water and/or 1,4-butanediol. If desired, low molecular weight, open-chain PTHF having an average molecular weight of from 200 to 700 Dalton may be recycled to the polymerization reaction, where it is converted into larger PTHF molecules. 1,4-Butanediol and low molecular weight, open-chain PTHF are incorporated in the PTHF chain not only as telogens but also as comonomers. For the preparation of PTHF monoesters of monocarboxylic acids, $C_1$–$C_{20}$-monocarboxylic acids are generally chosen as telogens, in particular $C_1$–$C_4$-monocarboxylic acids, particularly preferably formic acid. Both aliphatic and aromatic monocarboxylic acids may be used, depending on the intended use of the PTHF monocarboxylate. In the preparation of PTHF monoethers of monohydric alcohols, in general monohydric $C_1$–$C_{20}$-alcohols, particularly preferably monohydric $C_1$–$C_4$-alcohols, in particular tert-butanol and benzyl alcohol, are used as telogens. Both aliphatic and aromatic, monohydric alcohols are used, depending on the intended use of the PTHF monoethers of a monohydric alcohol. In the preparation of the PTHF monoesters of monocarboxylic acids as well as in the preparation of the PTHF monoethers of monohydric alcohols, 1,4-butanediol and/or low molecular weight PTHF can be polymerized in the PTHF chain.

Instead of 1,4-butanediol and/or open-chain, low molecular weight PTHF, other dihydric alcohols may also be used as telogens and comonomers, for example dihydric aliphatic $C_2$–$C_{20}$-alcohols, such as ethylene glycol or 1,3-propanediol, these dihydric alcohols being incorporated into the PTHF chain similarly to the 1,4-butanediol. The use of 1,4-butanediol or low molecular weight PTHF as a telogen is preferred to the use of other diols as a telogen, since 1,4-butanediol and low molecular weight PTHF introduce the same structural unit into the PTHF as THF, ie. the oxybutylene group, whereas the use of other diols leads to PTHF derivatives. From the point of view of process technology, however, the use of other diols is equivalent to the use of 1,4-butanediol or low molecular weight PTHF.

The telogen is advantageously fed to the polymerization as a solution in THF. Since the telogen causes the termination of the polymerization, the average molecular weight of the PTHF or of the PTHF monoester or monoether can be controlled by means of the amount of telogen used. The greater the amount of telogen present in the reaction mixture, the lower is the average molecular weight of the PTHF or of the relevant PTHF derivative. Depending on the telogen content of the polymerization mixture, PTHF or the relevant PTHF derivatives having average molecular weights of from 250 to 10,000 can be prepared in a controlled manner. The novel process is preferably used to prepare PTHF or the relevant PTHF derivatives having average molecular weights of from 500 to 10,000, particularly preferably from 1,000 to 3,000, Dalton. For this purpose, the telogen is added in amounts of from 0.04 to 17, preferably from 0.2 to 8, particularly preferably from 0.4 to 4, mol %, based on the amount of THF used.

The polymerization is carried out in general at from 0° to 80° C., preferably from 25° C. to the boiling point of THF. The pressure used is as a rule not critical for the result of the polymerization, and the latter is therefore generally carried out at atmospheric pressure or under the autogenous pressure of the polymerization system.

To avoid the formation of ether peroxides, the polymerization is advantageously carried out under an inert gas atmosphere. For example, nitrogen, hydrogen, carbon dioxide or the novel gases may be used as inert gases, nitrogen being preferably used.

The novel process may be operated batchwise or continuously, the continuous procedure being preferred for economic reasons.

In the batchwise procedure, the reactants THF, the relevant telogen and the zeolite catalyst are generally reacted in a stirred kettle at the stated temperatures until the desired conversion of the THF is reached. The reaction time may be from 0.5 to 40, preferably from 1 to 30, hours.

In the continuous procedure, the zeolite catalyst is advantageously arranged as a fixed bed and the THF is passed through the catalyst bed together with the relevant telogen by the liquid-phase or trickle-bed method. In general, THF feed rates of from 0.04 to 1, prefearbly from 0.07 to 0.3, particularly preferably from 0.09 to 0.25, g of THF per ml of catalyst per hour are established.

In the case of the batchwise procedure, working up is carried out by separating the zeolite catalyst suspended in the reacted mixture from the latter, advantageously by filtration, decanting or centrifuging.

The reacted polymerization mixture freed from the catalyst is generally worked up by distillation, unconverted THF being distilled off in a first stage. In a second purification stage, low molecular weight PTHF can, if desired, then be separated from the polymer by distillation under reduced pressure and recycled to the reactions. Alternatively, volatile THF oligomers can be depolymerized, for example by the process of DE-A 30 42 960, and thus recycled to the reaction. The depolymerization is particularly advantageous when the volatile PTHF oligomers have a relatively high content of cyclic THF oligomers.

If the activity of the zeolite catalyst declines after relatively long operation, said catalyst can be regenerated by heating in the presence of oxygen-containing gases, in particular air, at from 300° to 600° C., preferably from 450° to 500° C. The initial activity of the zeolite catalyst can be restored by this treatment. Alternatively, the deactivated zeolite catalyst can be reactivated by treatment for from 1 to 5 hours with aqueous hydrogen peroxide having a concentration of in general from 0.5 to 50, preferably from 2 to 40, particularly preferably from 5 to 30, % by weight, at in general from 60° to 100° C. After this reactivation, the catalyst is freed from associated water under the abovementioned conditions.

EXAMPLES

The average molecular weight ($M_n$) of the PTHF prepared was obtained by determining the OH number. The latter was determined by esterifying the hydroxyl groups with an excess of an acetic anhydride/pyridine mixture. After the reaction, excess acetic anhydride was hydrolysed to acetic acid with water, and the acetic acid thus liberated was back-titrated with sodium hydroxide solution. A blank sample which contained no PTHF was treated in the same manner.

The OH number of the sample is the amount of potassium hydroxide in mg which is equivalent to the acetic acid bound in the esterification of 1 g of substance. $M_n$ is calculated from the resulting OH number according to the following formula:

$$M_n = \frac{56 \cdot 100 \cdot 2}{\text{OH number}} \ [\text{g/mol}]$$

Example 1

2.88 g of powder of a ZSM-5 zeolite in H form, which had an $SiO_2/Al_2O_3$ molar ratio of 44, whose population ratio P was 0.03 and whose primary crystallites had a size of about 0.25 µm (prepared by the process described by Müller et al. in Occelli, Robson (Eds.), A.C.S. Symp. Series 398 (1989), 346), and 9.33 g of THF having a water content of 0.1% by weight were introduced into a 100 ml stirred glass reactor. The mixture was heated to 60° C. for 6 hours, the viscosity of the reaction mixture increasing. In order to terminate the polymerization, 50 ml of a mixture of 50 parts by volume of water and 50 parts by volume of toluene were added to the reactor, two phases forming. 2.37 g of PTHF, corresponding to a yield of 25% of theory, were obtained from the toluene phase after removal of unconverted THF and toluene by distillation. The average molecular weight $M_n$ was 9,000 D.

Example 2

A 160 ml tube reactor was filled, under an inert gas, with 100 ml of a ZBM-10 zeolite in the H form, which had been molded to give 1 mm extrudates and whose $SiO_2/Al_2O_3$ molar ratio was 46, whose population ratio P was 0.07, in which the primary crystallites had a size of from 0.05 to 0.1 µm and which had been prepared by a process of EP-A 7081. The water content of the zeolite had been brought beforehand to 0.55% by weight. THF with which different amounts of water had been mixed passed continuously upward through this fixed bed at 65° C. Unless stated otherwise in Table 1, the residence time of THF was 5 hours, based on the volume of the catalyst bed. Unconverted THF was separated from the colorless, polymer-containing reacted mixture by distillation. The results of these experiments with different THF feed rates are listed in Table 1.

TABLE 1

| Operating time (h) | $H_2O$ content in the THF (% by weight) | Feed rate of THF (ml/h) | THF conversion (%) | $M_n$ |
| --- | --- | --- | --- | --- |
| 67 | 0.1 | 20 | 11 | 3800 |
| 162 | 0.2 | 20 | 7.5 | 2200 |
| 210[1] | 0.2 | 17 | 8 | 2400 |
| 254[2] | 0.2 | 10 | 10 | 2700 |

[1] Residence time 6 h
[2] Residence time 10 h

Example 3

The Example is intended to illustrate the dependence of the THF conversion on the Si/Al molar ratio in the zeolite catalyst used.

The polymerization was carried out similarly to Example 1, using in each case 30% by weight of the zeolite in THF (water content 0.2% by weight). Table 2 summarizes the results.

TABLE 2

| Zeolite | Si/Al molar ratio | THF conversion (%) |
|---|---|---|
| ZSM-5 | 22 | 14 |
| ZSM-5 | 680 | 0 |
| ZSM-11 | 32 | 10 |
| Silikalit | 1000 | 0 |

Example 4

In a 100 ml stirred glass reactor, 2.42 g of ZBM-10 powder (for composition and preparation, see Example 2) and 11.2 g of THF having a 1,4-butanediol content of 1.0% by weight was stirred for 5 hours at 65° C. The polymerization mixture was worked up as in Example 1.

Yield of PTHF: 1 g=9% $M_n$: 2,500 Dalton

We claim:

1. A process for the preparation of polytetrahydrofuran or polytetrahydrofuran monoesters of $C_1$–$C_{20}$-monocarboxylic acids or polytetrahydrofuran monoethers of monohydric $C_1$–$C_{20}$-alcohols, having an average molecular weight of from 250 to 10,000 Dalton, by cationic polymerization of tetrahydrofuran in the presence of a telogen, wherein tetrahydrofuran is polymerized in the presence of water, 1,4-butanediol and/or polytetrahydrofuran having an average molecular weight of from 200 to 700 Dalton and/or of a $C_1$–$C_{20}$-monocarboxylic acid or of a monohydric $C_1$–$C_{20}$-alcohol with the aid of a catalytic amount of a zeolite catalyst which has an $SiO_2$/$Al_2O_3$ molar ratio of from 4:1 to 100:1 and in which the population ratio P of the acid centers on the external surface of the zeolite to the total number of acid centers of the zeolite is 0.03/1 or more, and the tetrahydrofuran used having a telogen content of from 0.04 to 17 mol %, based on the tetrahydrofuran.

2. A process as claimed in claim 1, wherein the zeolite catalyst used is a ZSM-5 zeolite, a ZSM-11 zeolite or a ZBM-10 zeolite.

3. A process as claimed in claim 1, wherein a zeolite having a water content of less than 2% by weight is used.

4. A process as claimed in claim 1, wherein a zeolite catalyst having a water content of less than 1% by weight is used.

5. A process as claimed in claim 1, wherein tetrahydrofuran having a water content of from 0.04 to 17 mol %, based on the tetrahydrofuran, is used.

6. A process as claimed in any of claims 1 to 5, wherein a zeolite catalyst whose population ratio P is from 0.03 to 0.35 is used.

7. A process as claimed in claim 1, wherein a zeolite catalyst whose population ratio P is from 0.03 to 0.1 is used.

8. A process as claimed in claim 1, wherein a zeolite catalyst whose alkali metal content is less than 50 ppm by weight is used.

* * * * *

UNITED STATES PATENT AND TRADEMARK OFFICE
CERTIFICATE OF CORRECTION

PATENT NO.: 5,641,857

DATED: June 24, 1997

INVENTOR(S): DOSTALEK et al.

It is certified that error appears in the above-identified patent and that said Letters Patent is hereby corrected as shown below:

Column 10, claim 6, line 19, "any of claims 1 to 5" should be --claim 1--.

Signed and Sealed this

Second Day of September, 1997

*Attest:*

BRUCE LEHMAN

*Attesting Officer*    Commissioner of Patents and Trademarks